United States Patent
Cho et al.

(10) Patent No.: US 12,342,311 B2
(45) Date of Patent: Jun. 24, 2025

(54) METHOD AND APPARATUS FOR ESTIMATING LOCATION

(71) Applicant: ELECTRONICS AND TELECOMMUNICATIONS RESEARCH INSTITUTE, Daejeon (KR)

(72) Inventors: Youngsu Cho, Daejeon (KR); Ju Il Jeon, Daejeon (KR); MyungIn Ji, Daejeon (KR); Kyeong-Soo Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 496 days.

(21) Appl. No.: 17/896,736

(22) Filed: Aug. 26, 2022

(65) Prior Publication Data
US 2023/0319762 A1 Oct. 5, 2023

(30) Foreign Application Priority Data
Apr. 4, 2022 (KR) .................. 10-2022-0041478

(51) Int. Cl.
*H04W 64/00* (2009.01)
(52) U.S. Cl.
CPC .................. *H04W 64/00* (2013.01)
(58) Field of Classification Search
CPC .................................................. H04W 64/00
(Continued)

(56) References Cited

U.S. PATENT DOCUMENTS 8,238,937 B2   8/2012   Ha et al.
8,918,276 B2   12/2014  Kim et al.
(Continued)

FOREIGN PATENT DOCUMENTS

CN   103763769 A   *   4/2014
JP   2013-516926 A       5/2013
(Continued)

OTHER PUBLICATIONS

Myungin Ji, et al., "Analysis of positioning infrastructure similarity at non-collection points using learning-based positioning DB", Electronics and Telecommunications Research Institute (ETRI), The 2nd Korea Artificial Intelligence Conference, pp. 219-220 (Oct. 1, 2021).

*Primary Examiner* — Sibte H Bukhari
(74) *Attorney, Agent, or Firm* — LRK PATENT LAW FIRM

(57) ABSTRACT

An apparatus for estimating location of a location request terminal receives a location request signal including first wireless communication infrastructure measurement information through a first wireless communication infrastructure of first coverage range and a second wireless communication infrastructure measurement information through a second wireless communication infrastructure of second coverage range greater than the first coverage range, estimates different types of second wireless communication infrastructure measurement information measured at the same location as the location request terminal, generates extended second wireless communication infrastructure measurement information by combining the second wireless communication infrastructure measurement information and the estimated second wireless communication infrastructure measurement information, and determines location of the location request terminal through comparison between a location DB storing the measurement information collected through the first (Continued)

wireless communication infrastructure and the second wireless communication infrastructure in correspondence with each grid location and the extended second wireless communication infrastructure measurement information.

18 Claims, 12 Drawing Sheets

(58) Field of Classification Search
USPC .......................................................... 370/252
See application file for complete search history.

(56) References Cited

U.S. PATENT DOCUMENTS

| | | |
|---|---|---|
| 9,843,644 B2 | 12/2017 | Cho et al. |
| 10,123,176 B2 | 11/2018 | Cho et al. |
| 2018/0017406 A1* | 1/2018 | Semnani .............. G01C 21/206 |
| 2021/0294824 A1 | 9/2021 | Ji et al. |

FOREIGN PATENT DOCUMENTS

| KR | 10-2009-0083105 A | 8/2009 |
|---|---|---|
| KR | 10-1822183 B1 | 1/2018 |
| KR | 10-1855378 B1 | 5/2018 |
| KR | 10-2019-0007310 A | 1/2019 |

\* cited by examiner

METHOD AND APPARATUS FOR ESTIMATING LOCATION

CROSS-REFERENCE TO RELATED APPLICATION

This application claims priority to and the benefit of Korean Patent Application No. 10-2022-0041478 filed in the Korean Intellectual Property Office on Apr. 4, 2022, the entire contents of which are incorporated herein by reference.

BACKGROUND OF THE INVENTION

1. Field of the Invention

The present disclosure relates to a method and apparatus for estimating a location, and more particularly, to a method and apparatus for estimating a location utilizing a long-range wireless communication infrastructure.

2. Description of Related Art

Global Positioning System (GPS)-based positioning technology may provide location information of a user terminal equipped with a GPS receiver as a global coordinate system system (e.g., latitude, longitude, altitude, etc.) with location accuracy of several meters to tens of meters in outdoor areas around the globe by using GPS satellites. In the future, with the advent of additional wide-area satellite navigation systems such as Galileo in Europe and Glonass in Russia, location availability and accuracy in outdoor areas are expected to improve. However, due to weak signal reception according to blocking of buildings and increased multi-path error in indoors and densely populated urban areas, the location determination is impossible or location accuracy is reduced. In addition, there is a problem that the initial location determination time (e.g., TTFF: Time To First Fix) takes a long time due to the degradation of the visible satellite.

Mobile communication base station-based positioning technology can perform TTFF relatively faster than GPS, whereas in the case of base station cell-based positioning, it is affected by base station arrangement, but generally has lower location accuracy than GPS.

In general, the base station-based positioning technology is a cell-identifier (Cell-ID) technology, trilateration technology, time difference of arrival (TDoA) technology, angle of arrival (AoA) technology, arrival of departure (AoD) technology, etc. can be classified.

On the other hand, Wi-Fi-based positioning technology can provide location information with precision of several meters using the received signal strength from Wi-Fi access points (APs) in buildings indoors and in densely populated areas where GPS signals are not received or the GPS location error is large. Recently, the service availability area has been expanded to a metropolitan area through wardriving or AP mapping technology. However, the wardriving technology using a vehicle requires a lot of cost to initially build the DB of the Wi-Fi AP. In addition, since the collection is performed in an outdoor area, the collection location uses GPS location information, which makes it impossible to obtain a collection location in an indoor area where the reception of GPS signals is difficult. In addition, even if the DB of the Wi-Fi AP is built in advance, location information cannot be provided if the positioning device is outside the coverage or the measured value of the Wi-Fi AP in the positioning device is intermittently or not measured, and when APs are moved or installed/removed, an update of the DB is required through periodic collection. In general, Wi-Fi-based positioning technology has a method of calculating the location of the terminal using Cell-ID, Centroid, or trilateration when the installation location of the Wi-Fi AP is known. If the installation location of the AP is not known, the Wi-Fi-based positioning technology has a fingerprinting or RF pattern mapping method in which the MAC address of each Wi-Fi AP, received signal strength, round trip time (RTT), AoA, etc. obtained from the reference locations where the exact location can be known or calculated are patterned in advance and then a reference location having a pattern most similar to a pattern received during positioning from a positioning terminal is provided as a terminal location.

Location information for emergency rescue refers to location information provided by an emergency rescue agency upon request to a location information service provider (e.g., a mobile communication service provider) when an emergency rescue request is received.

Positioning technologies for providing location information for emergency rescue mainly use base station-based, GPS-based, and Wi-Fi-based positioning technologies. Specifically, when an emergency rescue request is received, the emergency rescue agency requests location information for the mobile communication phone number from which the rescue is requested, the mobile communication service provider provides location information calculated by the method of calculating the location of the rescue request terminal requested by the emergency rescue agency to the location server by interworking with the rescue request terminal and the location server, to the emergency rescue agency.

However, since location information can be calculated using only the measurement information provided through the mobile communication service provider to which the rescue request terminal is subscribed only at the time of an emergency rescue request, it is difficult to provide corrected location information by using the measurement information accumulated before the emergency rescue request or by using map information. In particular, in the case of base station-based positioning technology, there is a limit in improving location accuracy because only a small amount of base station measurement information currently in communication or searched for can be used.

In the current outdoor environment, since it is possible to provide location information of tens of centimeters to several meters by combining multi-frequency signals from various navigation satellites such as Europe, Russia, and China as well as GPS in the United States, it can sufficiently satisfy the location accuracy required for emergency rescue.

However, in an indoor environment, GPS signals are usually weak or reception is blocked, so the base station or Wi-Fi-based positioning technology is relied on. It was difficult to improve location accuracy because of the limitations of the base station-based positioning technology or Wi-Fi-based positioning technology, or the fact that only measurement information for a limited time can be used in case of an emergency rescue request.

In addition, when a plurality of mobile communication service providers individually provide location information in response to an emergency rescue request, the difference in the performance and quality of location may be large depending on the established positioning technology method and performance level. Thus, in emergency situations such as crime, it was difficult to quickly and accurately determine the location of the emergency situations.

SUMMARY OF THE INVENTION

The present disclosure has been made in an effort to provide a method and apparatus for estimating a location capable of improving the accuracy of location information.

According to one embodiment, a method for estimating a location of a location request terminal in an apparatus for estimating a location is provided. The method for estimating a location includes: receiving a location request signal including first wireless communication infrastructure measurement information through a first wireless communication infrastructure of a first coverage range and second wireless communication infrastructure measurement information through a second wireless communication infrastructure of a second coverage range greater than the first coverage range acquired by the location request terminal, from the location request terminal; estimating different types of second wireless communication infrastructure measurement information measured at the same location as the location request terminal; generating extended second wireless communication infrastructure measurement information by combining the second wireless communication infrastructure measurement information included in the location request signal and the estimated different type of second wireless communication infrastructure measurement information; and determining a location of the location request terminal through comparison between a location DB storing the measurement information collected through the first wireless communication infrastructure and the second wireless communication infrastructure in correspondence with each grid location and the extended second wireless communication infrastructure measurement information.

The method for estimating a location may further include storing the first wireless communication infrastructure measurement information and the second wireless communication infrastructure measurement information included in the location request signal in a location request measurement information DB, and the estimating may include: comparing the similarity between the first wireless communication infrastructure measurement information included in the location request signal and the first wireless communication infrastructure measurement information stored in the location request measurement information DB; and extracting second wireless communication infrastructure measurement information corresponding to the first wireless communication infrastructure measurement information having the maximum similarity for each type of second wireless communication infrastructure to which the location request terminal is not subscribed from the location request measurement information DB.

The method for estimating a location may further include: before the receiving, dividing a certain area into a plurality of grids; generating combined measurement information for each infrastructure type by combining the measurement information at all collection locations in the same grid by infrastructure type, by using collection locations of the measurement information collected through the first wireless communication infrastructure and the second wireless communication infrastructure; and storing the combined measurement information for each type of infrastructure for each grid in the location DB.

The determining may include determining a location of the grid having the maximum similarity matching as the location of the location request terminal, through a similarity comparison between the extended second wireless communication infrastructure measurement information and combined second wireless communication infrastructure measurement information for each grid stored in the location DB.

The determining may include determining the location of the location request terminal using at least one grid location having similarity matching equal to or greater than a threshold value through a similarity comparison between the extended second wireless communication infrastructure measurement information and the combined second wireless communication infrastructure measurement information stored in the location DB.

The method for estimating a location may further include: calculating matching information for each grid by comparing the measurement information for each collection location for image matching and the combined measurement information for each type of infrastructure in each grid adjacent to each collection location; generating a matching information distribution image for each grid by using the matching information for each grid; and storing the matching information distribution image for each grid in the location DB.

The determining may include: generating an extended second wireless communication infrastructure matching distribution image by calculating matching information between the extended second wireless communication infrastructure measurement information and the combined second wireless communication infrastructure measurement information for each grid in the location DB; and determining the location of the location request terminal through similarity matching between the extended second wireless communication infrastructure matching distribution image and the matching information distribution image for each grid stored in the location DB.

The measurement information collected through the first wireless communication infrastructure and the second wireless communication infrastructure may be preferentially stored in a collection DB together with a collection location, and the method for estimating a location may further include: when receiving a true location of the location request terminal, calculating a location error for the determined location of the location request terminal using the true location; and storing the first wireless communication infrastructure measurement information and the second wireless communication infrastructure measurement information included in the location request signal together with the true location in the collection DB if the location error is greater than or equal to a set value.

The first wireless communication infrastructure may include a microcell or a femtocell, and the second wireless communication infrastructure may include a macrocell.

The first wireless communication infrastructure may include a sensor infrastructure linked to the inside or outside of the location request terminal.

According to another embodiment, an apparatus for estimating a location of a location request terminal is provided. The apparatus for estimating a location includes a location request measurement information DB, a location request collector, a location DB, an extended long-range wireless communication infrastructure measurement information generator, and a location determiner. The location request collector receives a location request signal including first wireless communication infrastructure measurement information through a first wireless communication infrastructure of a first coverage range and second wireless communication infrastructure measurement information through a second wireless communication infrastructure of a second coverage range greater than the first coverage range acquired by the location request terminal, from the location request terminal, and stores the first wireless communication infrastructure measurement information and the second wireless communication infrastructure measurement information included in the location request signal in the location request measurement information DB. The location DB stores measurement information collected through the first wireless communication infrastructure and the second wireless communication infrastructure in correspondence with each grid location. The extended long-range wireless communication infrastructure measurement information generator estimates different types of second wireless communication infrastructure measurement information measured at the same location as the location request terminal from the location request measurement information DB, and generates extended second wireless communication infrastructure measurement information by combining the second wireless communication infrastructure measurement information included in the location request signal and the estimated different type of second wireless communication infrastructure measurement information from the location request measurement information DB. The location determiner determines a location of the location request terminal through the comparison between the extended second wireless communication infrastructure measurement information and the measurement information in the location DB.

The extended long-range wireless communication infrastructure measurement information generator may compare the similarity between the first wireless communication infrastructure measurement information included in the location request signal and the first wireless communication infrastructure measurement information stored in the location request measurement information DB, and may extract second wireless communication infrastructure measurement information corresponding to the first wireless communication infrastructure measurement information having the maximum similarity for each type of second wireless communication infrastructure to which the location request terminal is not subscribed from the location request measurement information DB.

The apparatus for estimating a location may further include a location DB generator that divides a certain area into a plurality of grids, generates combined measurement information for each infrastructure type by combining the measurement information at all collection locations in the same grid by infrastructure type, by using collection locations of the measurement information collected through the first wireless communication infrastructure and the second wireless communication infrastructure, and stores the combined measurement information for each type of infrastructure for each grid in the location DB.

The location determiner may determine a location of the grid having the maximum similarity matching as the location of the location request terminal, through a similarity comparison between the extended second wireless communication infrastructure measurement information and combined second wireless communication infrastructure measurement information for each grid stored in the location DB.

The location determiner may determine the location of the location request terminal using at least one grid location having a similarity matching equal to or greater than a threshold value through a similarity comparison between the extended second wireless communication infrastructure measurement information and the combined second wireless communication infrastructure measurement information stored in the location DB.

The location DB generator may calculate matching information for each grid by comparing the measurement information for each collection location for image matching and the combined measurement information for each type of infrastructure in each grid adjacent to each collection location, may generate a matching information distribution image for each grid by using the matching information for each grid, and may store the matching information distribution image for each grid in the location DB.

The location determiner may generate an extended second wireless communication infrastructure matching distribution image by calculating matching information between the extended second wireless communication infrastructure measurement information and the combined second wireless communication infrastructure measurement information for each grid in the location DB, and may determine the location of the location request terminal through similarity matching between the extended second wireless communication infrastructure matching distribution image and the matching information distribution image for each grid stored in the location DB.

The apparatus for estimating a location may further include a multi-source infrastructure collector that collects measurement information together with collection locations through the first wireless communication infrastructure and the second wireless communication infrastructure using user participation or a dedicated collection method and stores it in a collection DB.

The apparatus for estimating a location may further include a collection DB updater that calculates a location error for the determined location of the location request terminal using a true location of the location request terminal, and stores the first wireless communication infrastructure measurement information and the second wireless communication infrastructure measurement information included in the location request signal together with the true location in the collection DB if the location error is greater than or equal to a set value, when the true location of the location request terminal is received.

The first wireless communication infrastructure may include a microcell or a femtocell, and the second wireless communication infrastructure may include a macrocell.

DETAILED DESCRIPTION OF THE EMBODIMENTS

Figure 1:
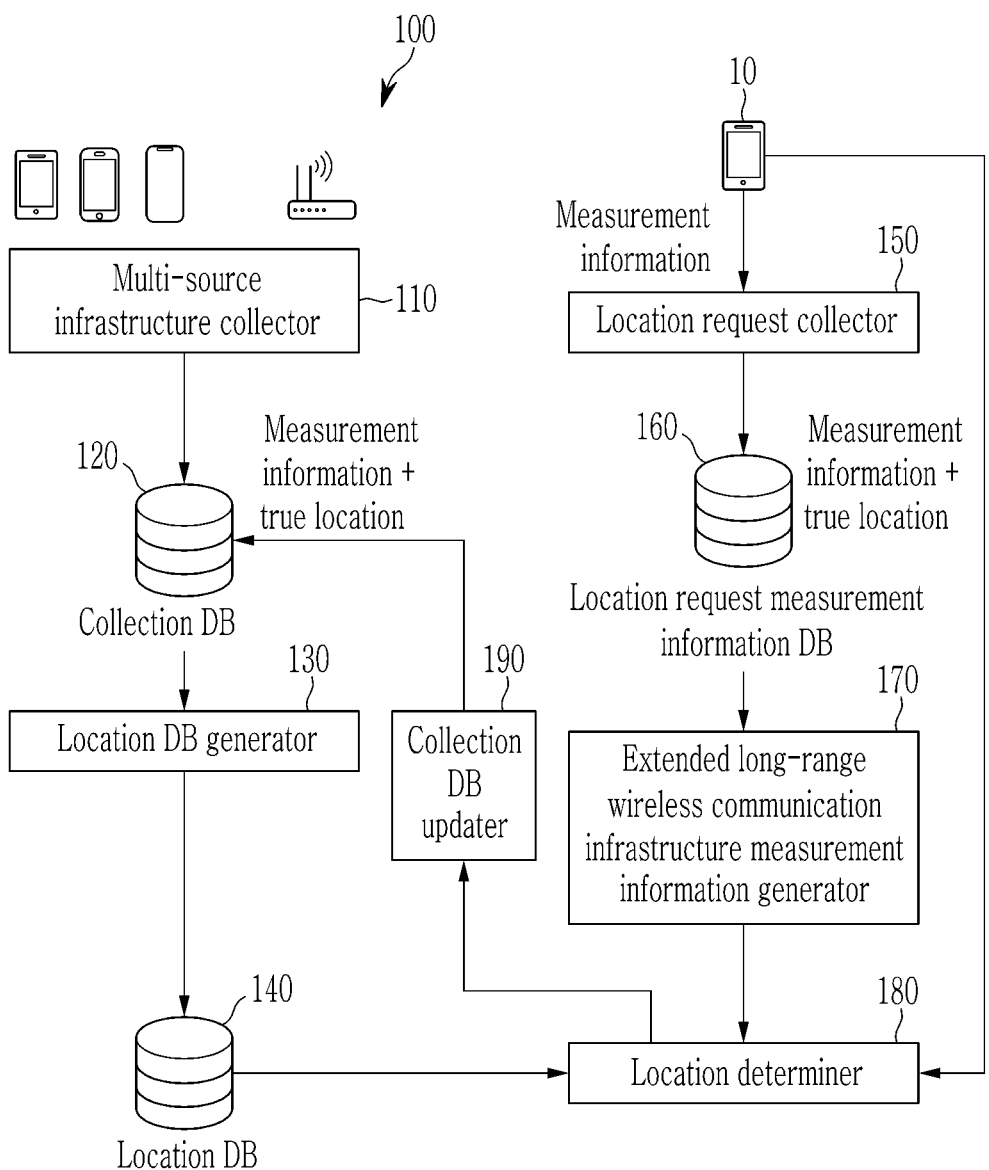
FIG. 1 is a diagram illustrating an apparatus for estimating a location according to an embodiment.

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

Furthermore, in this specification, each of the phrases such as "A or B", "at least one of A and B", "at least one of A or B", "A, B, or C", "at least one of A, B, and C", and "at least one of A, B, or C" may include any one of the items listed together in the corresponding one of the phrases, or all possible combinations thereof.

Now, a method and apparatus for estimating a location according to an embodiment of the present disclosure will be described in detail with reference to the drawings.

FIG. 1 is a diagram illustrating an apparatus for estimating a location according to an embodiment.

Referring to FIG. 1, the apparatus for estimating a location 100 includes a multi-source infrastructure collector 110, a collection database (DB) 120, a location DB generator 130, a location DB 140, a location request collector 150, a location request measurement information DB 160, an extended long-range wireless communication infrastructure measurement information generator 170, a location determiner 180, and a collection DB updater 190.

The multi-source infrastructure collector 110 collects long-range wireless communication infrastructure measurement information, short-range wireless communication infrastructure measurement information, sensor infrastructure measurement information, etc. together with the collection location at one or more collection points, and collects measurement information corresponding to the collection location in the collection DB 120. The collection location means coordinates, addresses, trade names, and other identifiers that can spatially characterize the collection point. For example, the collection location may use location coordinates provided by the GNSS receiver at the time of collection, or a method of selecting a point of interest (POI) or a building location on a map may be used for the collection location.

Long-range wireless communication infrastructure refers to 2nd/3rd/4th/5th/6th generation macrocells that can cover hundreds of meters to several kilometers, and long-range wireless communication infrastructure measurement information includes data such as radio channel information received by the terminal from the base stations of the macrocells.

Short-range wireless communication infrastructure refers to a microcell or femtocell that can cover several meters to tens of meters, and short-range wireless communication infrastructure measurement information includes measurement data that a terminal can receive from a device that transmits radio waves or light for wireless communication and positioning such as Wi-Fi, BT (Bluetooth), BLE (Bluetooth) Low Energy), UWB (Ultra-Wide Band), a visible light communication device, etc. As an embodiment, the corresponding data may include a wireless communication infrastructure identifier, transmit signal strength, transmit frequency, receive signal strength and quality indicators (RSSI, RSRP, RSRQ, etc.), round trip time (RTT), radio arrival reception Angle of Arrival (AoA), angle of departure (DoA), etc., and in addition, all information that can be received by being included in standard data for each wireless communication infrastructure may be included in the corresponding data.

The sensor infrastructure measurement information means information measured or estimated from sensors linked to the inside or outside of the terminal, and includes, for example, images, barometric pressure, atmospheric pressure, direction, movement action or states, and the like.

The multi-source infrastructure collector 110 may collect long-range wireless communication infrastructure measurement information, short-range wireless communication infrastructure measurement information, sensor infrastructure measurement information, etc. along with collection locations using a user participation method and a dedicated collection method.

Figure 2:
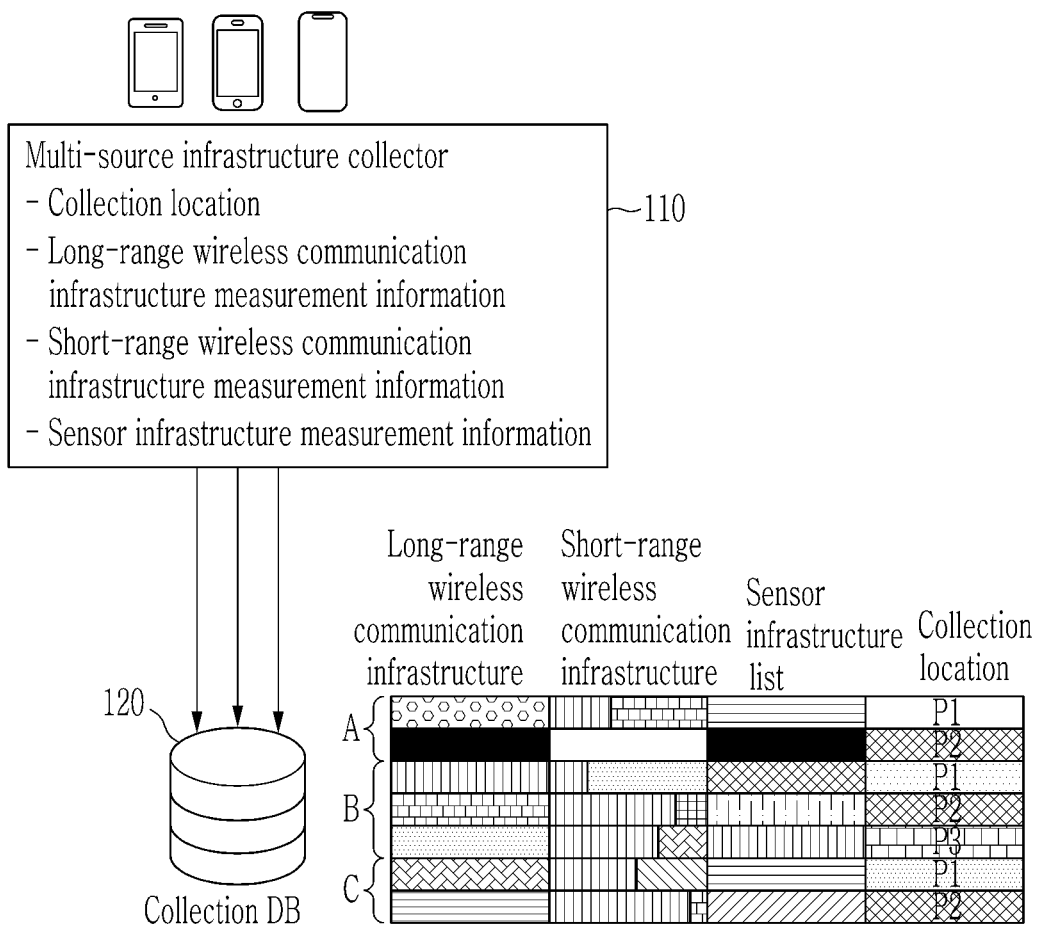
FIG. 2 is a diagram for explaining a method of collecting data using a user participation method in the multi-source infrastructure collector shown in FIG. 1.

FIG. 2 is a diagram for explaining a method of collecting data using a user participation method in the multi-source infrastructure collector shown in FIG. 1.

Referring to FIG. 2, the multi-source infrastructure collector 110 receives long-range wireless communication infrastructure measurement information, short-range wireless communication infrastructure measurement information, and sensor infrastructure measurement information acquired from terminals possessed by users along with the collection locations P1, P2, and P3, and stores the measurement information received from the terminals possessed by users corresponding to the collection locations P1, P2, and P3 in the collection DB 120.

In this user participation method, only measurement information of the long-range wireless communication infrastructure to which each user is subscribed can be received. Since the long-range wireless communication infrastructure to which users are subscribed is various, it may be possible to collect various types of long-range wireless communication infrastructure measurement information A, B, and C through the participation of many users.

Figure 3:
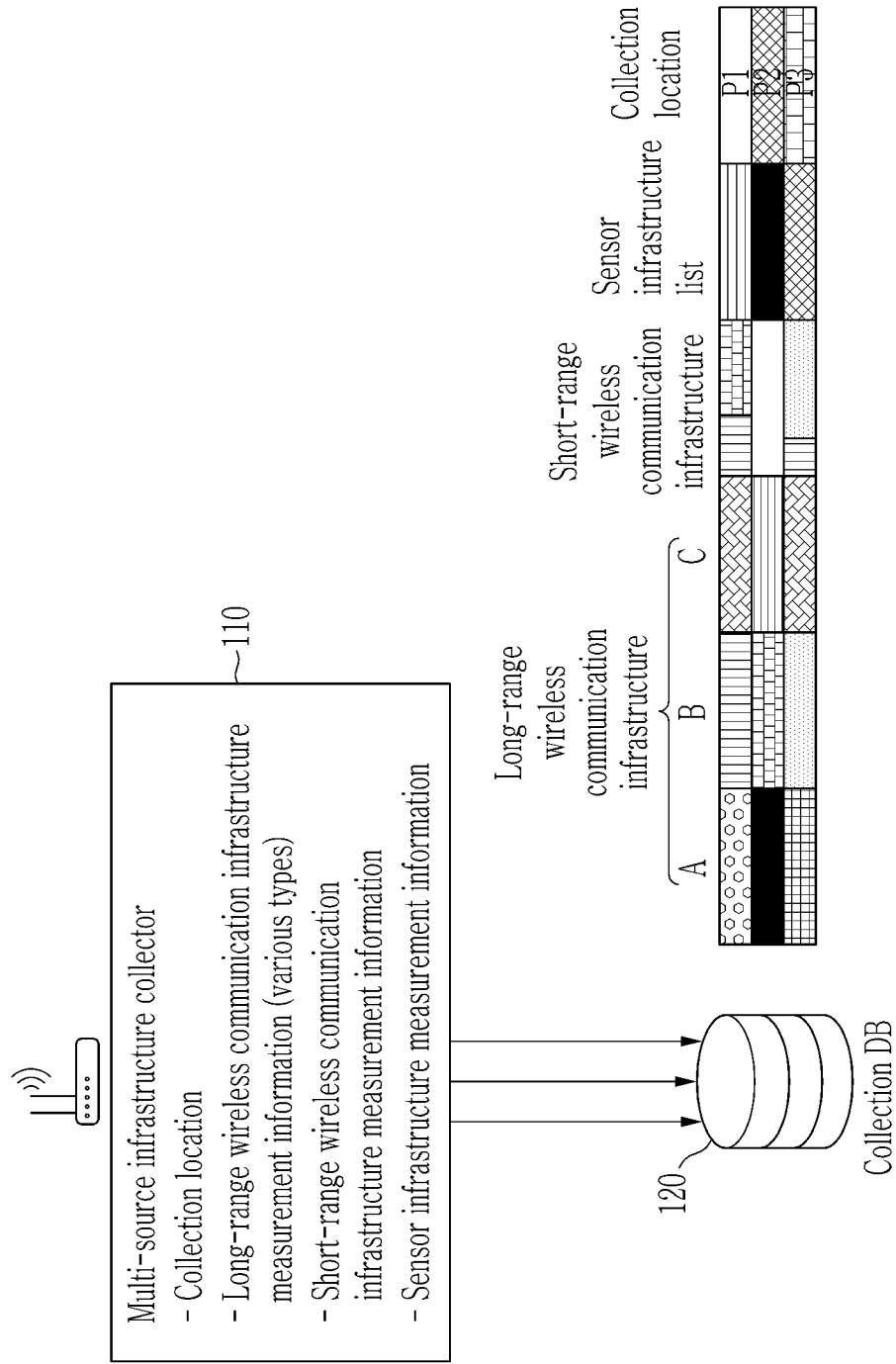
FIG. 3 is a diagram for explaining a method of collecting data using a dedicated collection method in the multi-source infrastructure collector shown in FIG. 1.

FIG. 3 is a diagram for explaining a method of collecting data using a dedicated collection method in the multi-source infrastructure collector shown in FIG. 1.

Referring to FIG. 3, the multi-source infrastructure collector 110 receives various types of long-range wireless communication infrastructure measurement information A, B, and C, short-range wireless communication infrastructure measurement information, and sensor infrastructure measurement information acquired from collector's dedicated collection devices together with the collection locations P1, P2, and P3, and stores the measurement information received from the collection devices corresponding to the collection locations P1, P2, and P3 in the collection DB 120.

This dedicated collection method can acquire various types of long-range wireless communication infrastructure measurement information A, B, and C through the collection devices, so it can uniformly database the various types of long-range wireless communication infrastructure measurement information for each collection location, but an additional cost may occur because dedicated collection devices are required.

Again, referring to FIG. 1, the location DB generator 130 generates a two-dimensional (2D) or three-dimensional (3D) spatial grid at regular intervals. The 2D may mean, for example, latitude and longitude, and may mean X and Y coordinates. The 3D may mean latitude, longitude, and altitude, and may mean X, Y, and Z coordinates.

The location DB generator 130 generates combined multi-source infrastructure measurement information for each type of infrastructure in the same grid area using the collected information stored in the collection DB 120, and stores the combined multi-source infrastructure measurement information for each type of infrastructure in the same grid area in the location DB 140.

The combined multi-source infrastructure measurement information according to the grid locations G1 and G2 stored in the location DB 140 is used in the positioning determiner 180 to determine the location of the location request terminal.

Figure 4:
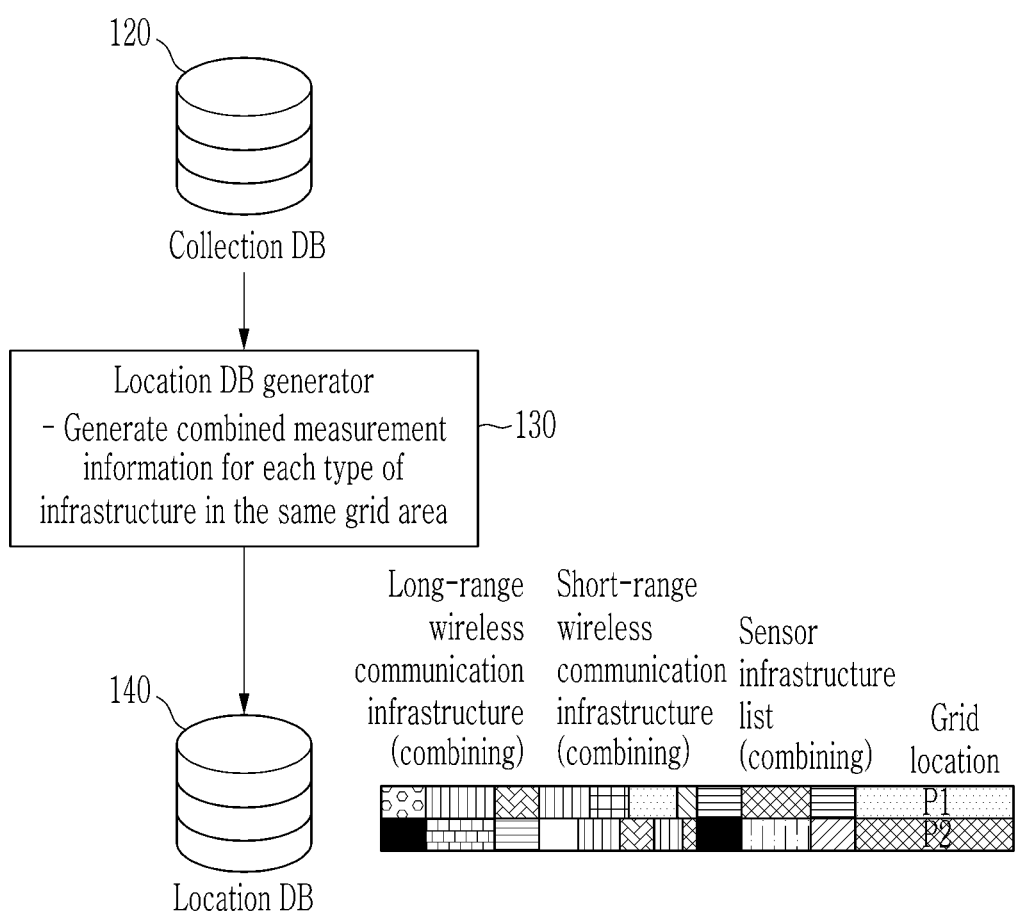
FIG. 4 is a diagram illustrating an example of a method of generating a location DB in the location DB generator shown in FIG. 1.

FIG. 4 is a diagram illustrating an example of a method of generating a location DB in the location DB generator shown in FIG. 1.

Referring to FIG. 4, the location DB generator 130 generates combined measurement information for each type of infrastructure by combining measurement information for all collection locations P1, P2, and P3 in the same grid G1 and G2 by type of infrastructure, and stores it in the location DB 140.

In this case, the positioning DB 140 may include the combined long-range wireless communication infrastructure measurement information, the combined short-range wireless communication infrastructure measurement information, and the combined sensor infrastructure measurement information in response to the grid locations G1 and G2.

For example, the combined measurement information in the same grid includes reception identifiers of long-range wireless communication infrastructure, short-range wireless communication infrastructure, sensor infrastructure, etc. at all collection locations included in the same grid, and the accumulated value or statistical value of measurement values available for positioning. The statistical value may include a reception probability of a specific reception identifier, an average value or standard deviation value of reception signal strength, and the like.

Even for measurement information within the same collection location, different information is provided depending on the channel status of the wireless communication infrastructure, the terminal communication chip and antenna type, the sensor type etc., and the location DB generator 130 stores the measurement information for each grid in the location DB 140 in the form of statistical values.

Figure 5:
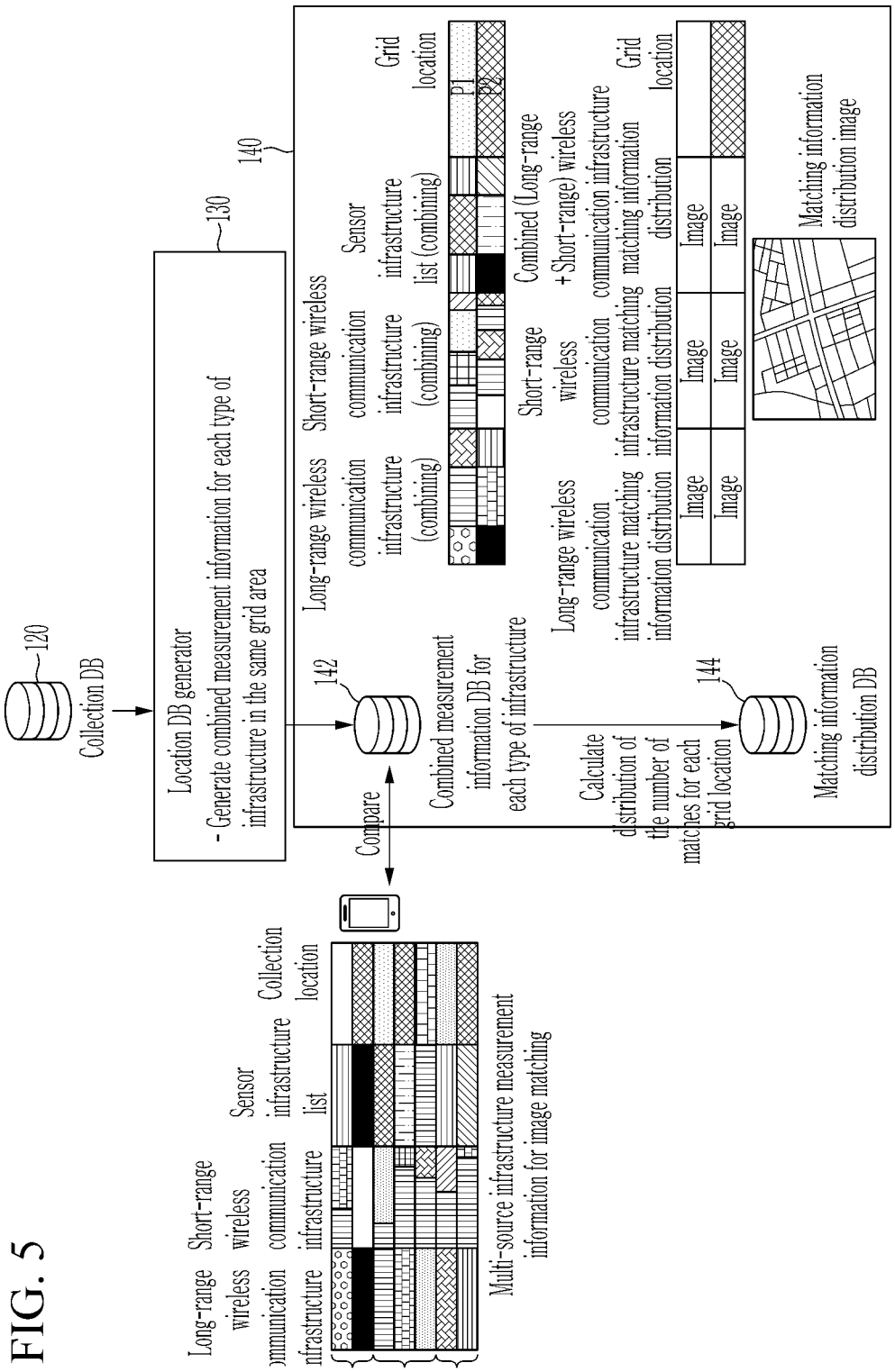
FIG. 5 is a diagram illustrating another example of a method for generating a location DB in the location DB generator shown in FIG. 1.

FIG. 5 is a diagram illustrating another example of a method for generating a location DB in the location DB generator shown in FIG. 1.

Referring to FIG. 5, the location DB generator 130 generates combined measurement information for each type of infrastructure by combining measurement information for all collection locations P1, P2, and P3 in the same grid G1 and G2 by type of infrastructure, and stores it in the combined measurement information DB 142 for each type of infrastructure in the location DB 140 in the same manner as described in FIG. 4.

The location DB generator 130 compares the multi-source infrastructure measurement information of each collection location for image matching and the combined measurement information for each type of infrastructure of grid locations adjacent to each collection location in the combined measurement information DB 142 for each type of infrastructure, and may calculate the matching information for each grid location. Multi-source infrastructure measurement information in each collection location for image matching may be a part of the collection information stored in the collection DB 120, and the remaining part of the collection information stored in the collection DB 120 may be used to generate combined measurement information for each type of infrastructure of each grid G1, and G2. Alternatively, the multi-source infrastructure measurement information of each collection location for image matching may be separately collected.

The location DB generator 130 generates matching information distribution images by using the calculated matching information. The location DB generator 130 may generate matching information distribution images for each grid location by displaying matching information for each location of the grid as an image on the map using the calculated matching information.

The matching information may include the number of matches, a correlation coefficient of the matching measurement information, and the like.

For example, the location DB generator 130 compares the reception identifier for each collection location among the multi-source infrastructure measurement information of each collection location for image matching and the reception identifier of the grid location adjacent to each collection location in the combined measurement information DB 142 for each type of infrastructure, and can calculate the number of matches between the reception identifiers.

Again, referring to FIG. 1, when the location request collector 150 receives a location request including multi-source infrastructure measurement information from the location request terminal 10, it stores the multi-source infrastructure measurement information received from the location request terminal 10 in the location request measurement information DB 160. The location request measurement information DB 160 stores multi-source infrastructure measurement information received from terminals requesting a location to the apparatus for estimating a location 100.

For location calculation, any user terminal can acquire measurement information such as long-range wireless communication infrastructure, short-range wireless communication infrastructure, sensor infrastructure, etc. of the mobile communication company (e.g., A) subscribed to by the user terminal through the operation in the terminal.

Since the mobile communication companies (e.g., A, B, and C) subscribed to by a plurality of arbitrary user terminals are different from each other, long-range wireless communication infrastructure measurement information acquired by an unspecified number of user terminals requesting location, short-range wireless communication infrastructure measurement information and sensor infrastructure measurement information is stored in the location request measurement information DB 160. Therefore, in the location request measurement information DB 160, in addition to the mobile communication company to which the location request terminal 10 is subscribed, long-range wireless communication infrastructure measurement information, short-range wireless communication infrastructure measurement information, and sensor infrastructure measurement information measured from mobile communication companies to which the location request terminal 10 is not subscribed are all stored.

The location request collector 150 transmits the location request signal including the multi-source infrastructure measurement information received from the location request terminal 10 to the extended long-range wireless communication infrastructure measurement information generator 170.

When the extended long-range wireless communication infrastructure measurement information generator 170 receives the location request signal, it estimates a different type of long-range wireless communication infrastructure measurement information measured at the same location as the location request terminal 10 through similarity comparison between the short-range wireless communication infrastructure measurement information included in the location request signal and the short-range wireless communication infrastructure measurement information in the location request measurement information DB 160. The extended long-range wireless communication infrastructure measurement information generator 170 compares the similarity between the short-range wireless communication infrastructure measurement information included in the location request signal and the short-range wireless communication infrastructure measurement information in the location request measurement information DB 160, extracts different types of long-range wireless communication infrastructure measurement information to which the location request terminal 10 is not subscribed from the location request measurement information DB 160, and may estimate the extracted different types of long-range wireless communication infrastructure measurement information as a different type of long-range wireless communication infrastructure measurement information measured at the same location as the location request terminal 10.

The extended long-range wireless communication infrastructure measurement information generator 170 generates extended long-range wireless communication infrastructure measurement information by combining the extracted different types of long-range wireless communication infrastructure measurement information with the long-range wireless communication infrastructure measurement information included in the location request signal.

The location determiner 180 compares the extended long-range wireless communication infrastructure measurement information generated by the extended long-range wireless communication infrastructure measurement information generator 170 with the combined long-range wireless communication infrastructure measurement information stored in the location DB 140 to determine the location of the location request terminal 10. The location determiner 180 may determine the location of the grid having the maximum similarity matching between the extended long-range wireless communication infrastructure measurement information and the combined long-range wireless communication infrastructure measurement information stored in the location DB 140 as the location of the location request terminal 10. The location determiner 180 calculates the weighted sum of candidate grid locations having similarity matching above a threshold value between the extended long-range wireless communication infrastructure measurement information and the combined long-range wireless communication infrastructure measurement information stored in the location DB 140, and may determine the calculated weighted sum as the location of the location request terminal 10.

When the location of the location request terminal 10 is determined from the multi-source infrastructure measurement information provided by the location request terminal 10 for location calculation at an arbitrary location by the location determiner 180, the collection DB updater 190 calculates a location error from the location of the location request terminal 10, and determines whether to store the multi-source infrastructure measurement information provided by the location request terminal 10 in the collection DB 120 based on the position error. The collection DB updater 190 operates when a location error calculation is possible from the location of the location request terminal 10.

Figure 6:
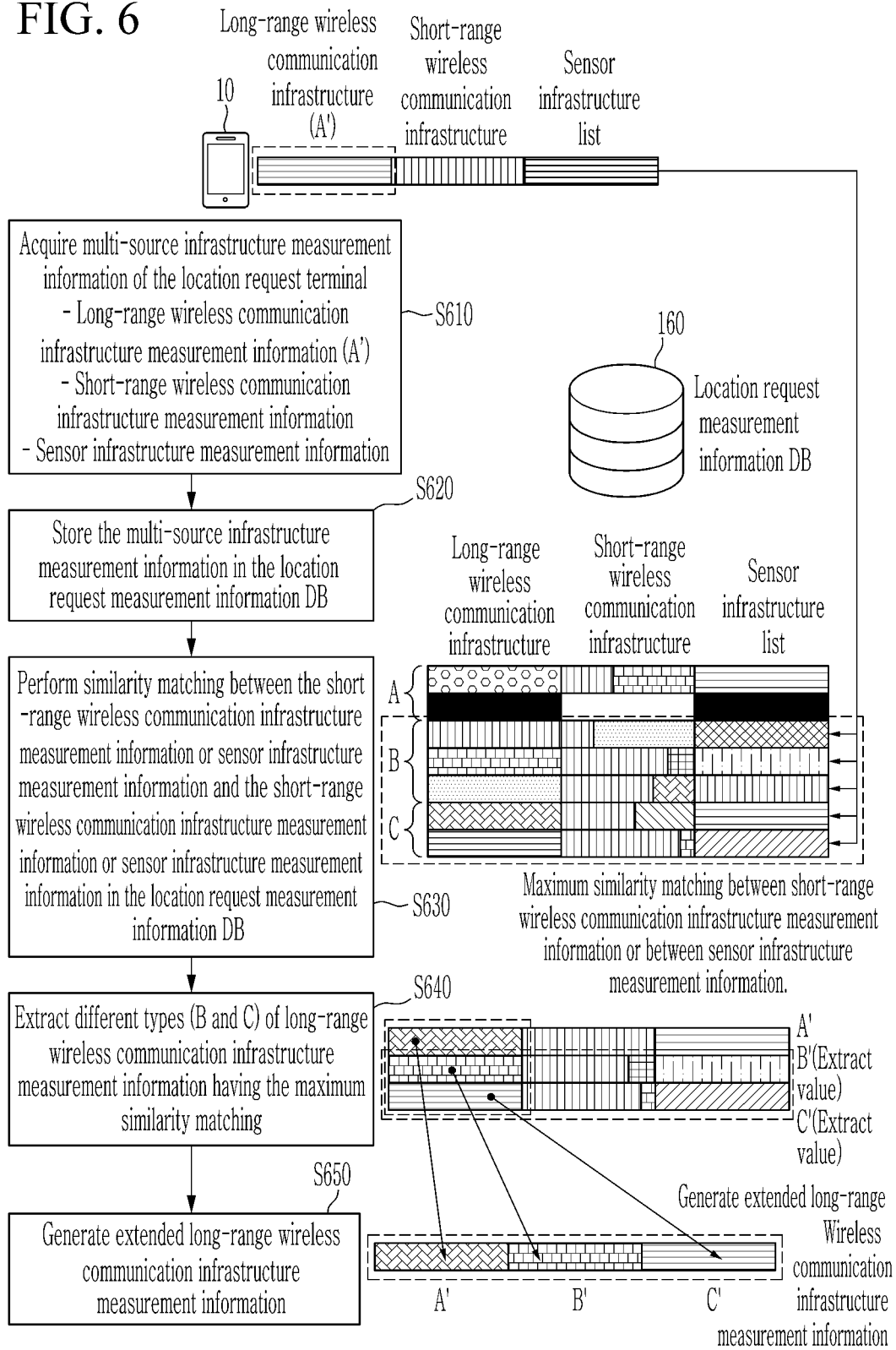
FIG. 6 is a flowchart illustrating a method of generating extended long-range wireless communication infrastructure measurement information in the extended long-range wireless communication infrastructure measurement information generator illustrated in FIG. 1.

FIG. 6 is a flowchart illustrating a method of generating extended long-distance wireless communication infrastructure measurement information in the extended long-distance wireless communication infrastructure measurement information generator illustrated in FIG. 1.

Referring to FIG. 6, the extended long-range wireless communication infrastructure measurement information generator 170 acquires multi-source infrastructure measurement information of the location request terminal 10 (S610). For convenience of explanation, assuming that the location request terminal 10 is subscribed to A' mobile communication company, the extended long-range wireless communication infrastructure measurement information generator 170 may acquire long-range wireless communication infrastructure measurement information of type A' to which the location request terminal 10 is subscribed, short-range wireless communication infrastructure measurement information, and sensor infrastructure measurement information.

The extended long-range wireless communication infrastructure measurement information generator 170 stores the multi-source infrastructure measurement information received from the location request terminal 10 in the location request measurement information DB 160 (S620).

The extended long-range wireless communication infrastructure measurement information generator 170 performs similarity matching between the short-range wireless communication infrastructure measurement information or sensor infrastructure measurement information among the multi-source infrastructure measurement information of the location request terminal 10 and the short-range wireless communication infrastructure measurement information or sensor infrastructure measurement information in the location request measurement information DB 160 (S630). The information having a discrimination according to a location may be used as measurement information to perform similarity matching in step S630. For example, among the sensor infrastructure measurement information, it is difficult to use the atmospheric pressure information that provides a similar value regardless of a specific location as similarity matching. Among the short-range wireless communication infrastructure measurement information, Wi-Fi, Bluetooth, etc. can provide measurement values only within the transmission range of the corresponding AP (or beacon), so it has the ability to discriminate according to location. Thus, the measurement information acquired through Wi-Fi or Bluetooth may be used for similarity matching in step S630.

The extended long-range wireless communication infrastructure measurement information generator 170 extracts different types of long-range wireless communication infrastructure measurement information having the maximum similarity matching (S640). For example, the extended long-range wireless communication infrastructure measurement information generator 170 may extract different types of long-range wireless communication infrastructure measurement information B' and C' stored in response to the short-range wireless communication infrastructure measurement information having the greatest similarity to the short-range wireless communication infrastructure measurement information of the location request terminal 10 in the location request measurement information DB 160.

The extended long-range wireless communication infrastructure measurement information generator 170 generates extended long-range wireless communication infrastructure measurement information by combining the long-range wireless communication infrastructure of the A' type to which the location request terminal 10 is subscribed and extracted different types of long-distance wireless communication infrastructure measurement information B' and C' (S650).

In general, a user terminal cannot directly measure wireless signals of mobile communication companies other than the mobile communication company to which the user terminal has subscribed. Therefore, in this embodiment, in order to more accurately estimate different types of long-range wireless communication infrastructure measurement information measured at the same location, different types of long-range wireless communication infrastructure measurement information measured indirectly from the location request measurement information DB 160 at the same location are estimated using a maximum similarity matching technique between short-range wireless communication infrastructure measurement information with relatively small communication coverage or between sensor infrastructure measurement information. In this case, as the communication coverage of the short-range wireless communication infrastructure or the discrimination coverage of the sensor measurement value is smaller, more accurate long-range wireless communication infrastructure measurement information can be estimated.

As an example, it is assumed that a specific identifier (e.g., MAC address) list of a specific short-range wireless communication infrastructure (e.g., Wi-Fi) in the multi-source infrastructure measurement information of the location request terminal 10 is received. At this time, the extended long-range wireless communication infrastructure measurement information generator 170 may extract the identifier list having the maximum similarity with the specific identifier list received from the location request terminal 10 in the location request measurement information DB 160, and may extract different types of long-distance wireless communication infrastructure measurement information than the long-range wireless communication infrastructure measurement information received from the location request terminal 10 among long-range wireless communication infrastructure measurement information stored in correspondence to the extracted identifier list.

As another example, assuming that a specific sensor value in the multi-source infrastructure measurement information of the location request terminal 10 is received, the extended long-range wireless communication infrastructure measurement information generator 170 may extract a sensor value having the maximum similarity with the specific sensor value in the location request measurement information DB 160, and may extract different types of long-distance wireless communication infrastructure measurement information than the long-range wireless communication infrastructure measurement information received from the location request terminal 10 among long-range wireless communication infrastructure measurement information stored in correspondence to the extracted sensor value.

The extended long-range wireless communication infrastructure measurement information generator 170 transmits the extended long-range wireless communication infrastructure measurement information to the location determiner 180.

Figure 7:
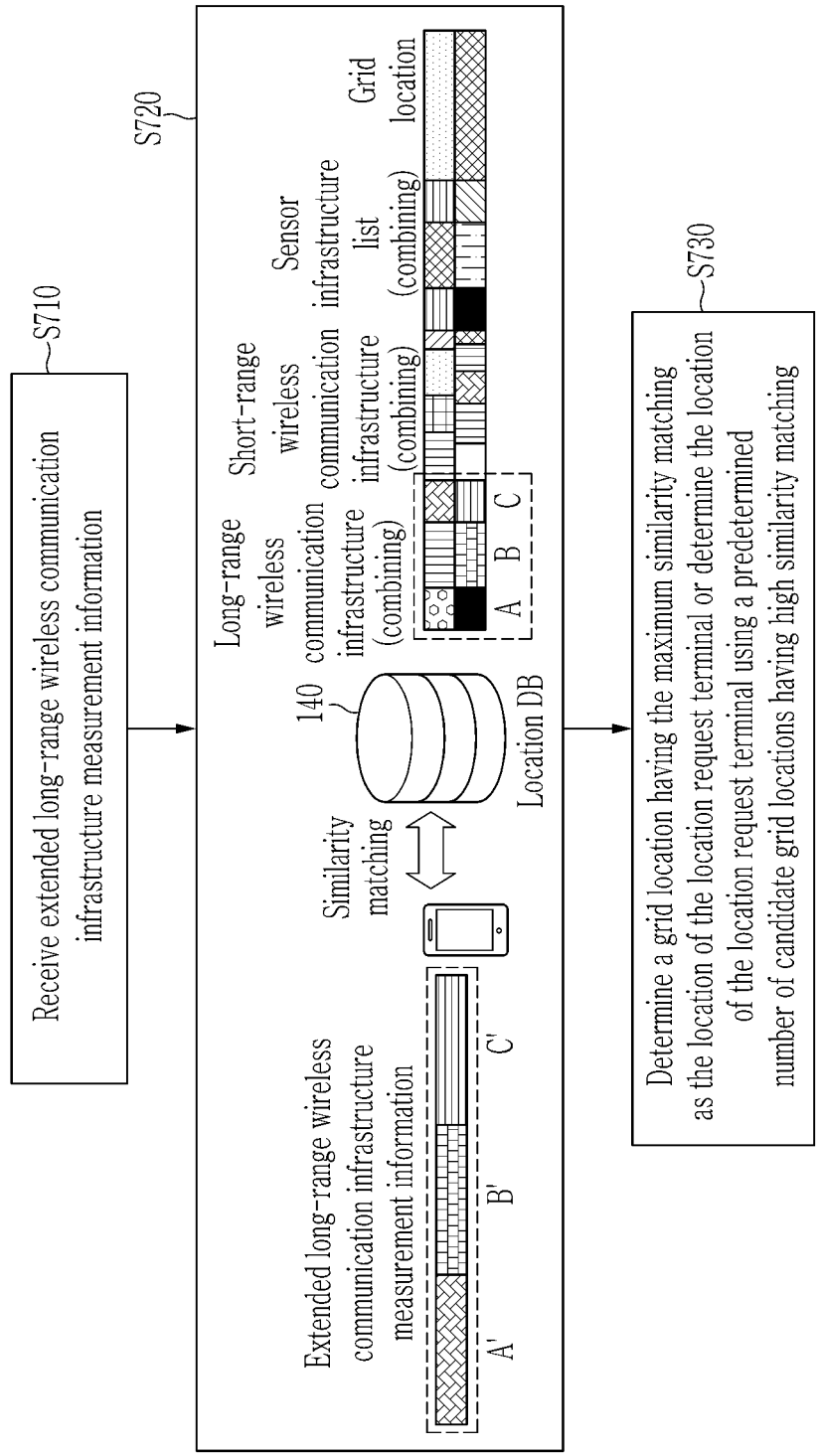
FIG. 7 is a flowchart illustrating an example of a method for determining a location of a location request terminal in the location determiner shown in FIG. 1.

FIG. 7 is a flowchart illustrating an example of a method for determining a location of a location request terminal in the location determiner shown in FIG. 1.

Referring to FIG. 7, the location determiner 180 receives extended long-range wireless communication infrastructure measurement information generated from the multi-source infrastructure measurement information provided by the location request terminal 10 for location calculation (S710), and performs similarity matching of the extended long-range wireless communication infrastructure measurement information with the combined long-range wireless communication infrastructure measurement information for each grid location among the combined measurement information for each type of infrastructure in the location DB (140 in FIG. 4) (S720). The location DB (140 in FIG. 4) is the same as the combined measurement information DB 142 for each type of infrastructure in FIG. 5.

As a result of the similarity matching, the location determiner 180 may determine a grid location corresponding to the combined long-range wireless communication infrastructure measurement information having the maximum similarity matching as the location of the location request terminal 10 (S730).

The location determiner 180 may extract candidate grid locations corresponding to a predetermined number of combined long-range wireless communication infrastructure measurement information having high similarity matching as a result of the similarity matching, and may determine a location of the location request terminal 10 using the candidate grid locations (S730). For example, the location determiner 180 may allocate weights to the corresponding candidate grid locations in proportion to the similarity, and may determine the location of the location request terminal 10 using the candidate grid locations to which the weights are allocated.

Figure 8:
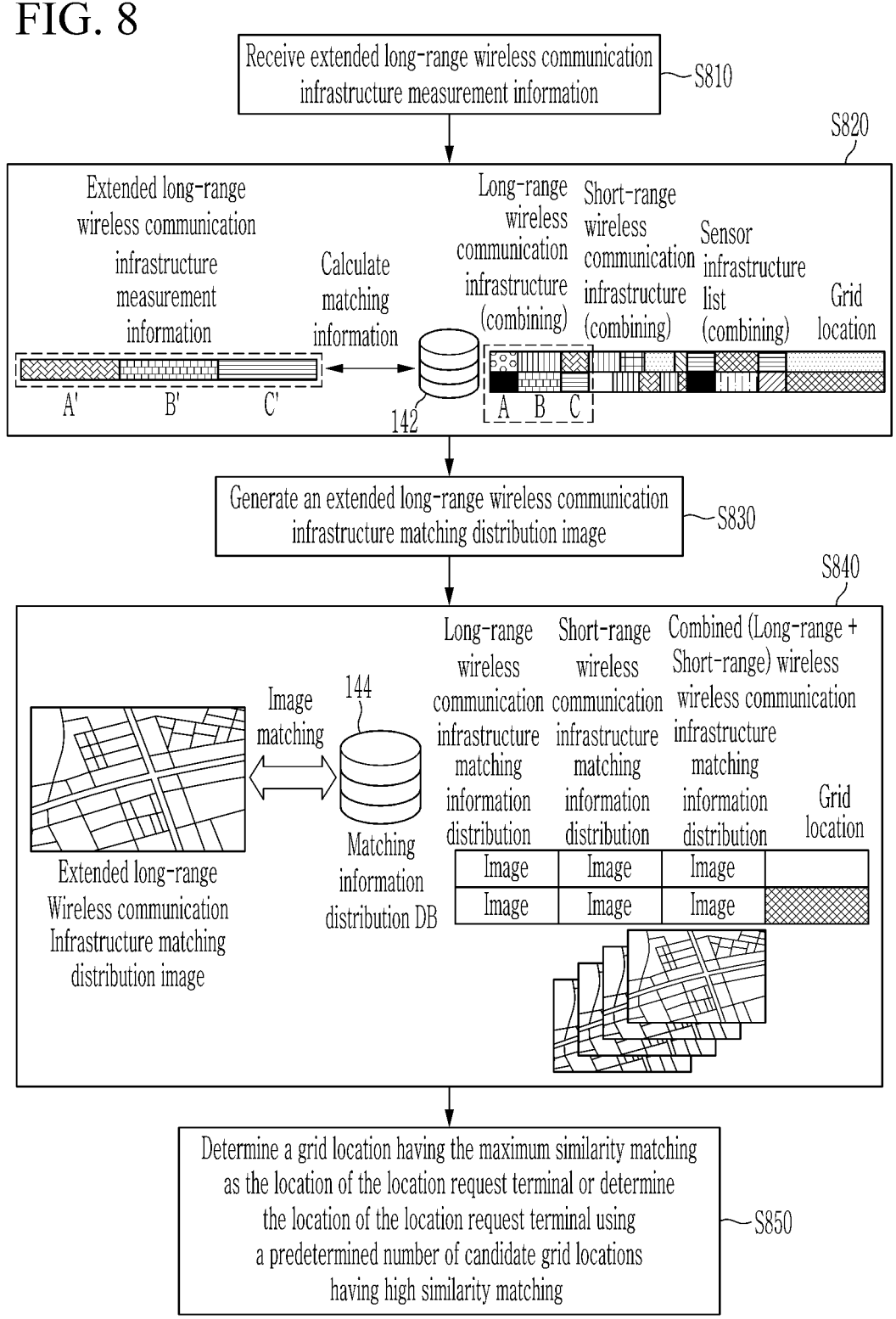
FIG. 8 is a flowchart illustrating another example of a method for determining a location of a location request terminal in the location determiner shown in FIG. 1.

FIG. 8 is a flowchart illustrating another example of a method for determining a location of a location request terminal in the location determiner shown in FIG. 1.

Referring to FIG. 8, the location determiner 180 receives extended long-range wireless communication infrastructure measurement information generated from the multi-source infrastructure measurement information provided by the location request terminal 10 for location calculation (S810), and calculates matching information by comparing the extended long-range wireless communication infrastructure measurement information and the combined measurement information for each type of infrastructure in the combined measurement information DB 142 for each type of infrastructure (S820). The location determiner 180 may calculate matching information by comparing the extended long-range wireless communication infrastructure measurement information with the combined long-range wireless communication infrastructure measurement information in the combined measurement information DB 142 for each type of infrastructure.

The location determiner 180 generates an extended long-range wireless communication infrastructure matching distribution image by using the calculated matching information (S830).

The location determiner 180 performs similarity matching between the extended long-range wireless communication infrastructure matching distribution image and the long-range wireless communication infrastructure matching information distribution image for each grid location in the matching information distribution DB 144 (S840).

As a result of the similarity matching, the location determiner 180 may determine a grid location having the maximum similarity matching as the location of the location request terminal 10 (S850).

As a result of the similarity matching, the location determiner 180 may extract a predetermined number of candidate grid locations having high similarity matching, and determine the location of the location request terminal 10 using the candidate grid locations (S850).

Figure 9:
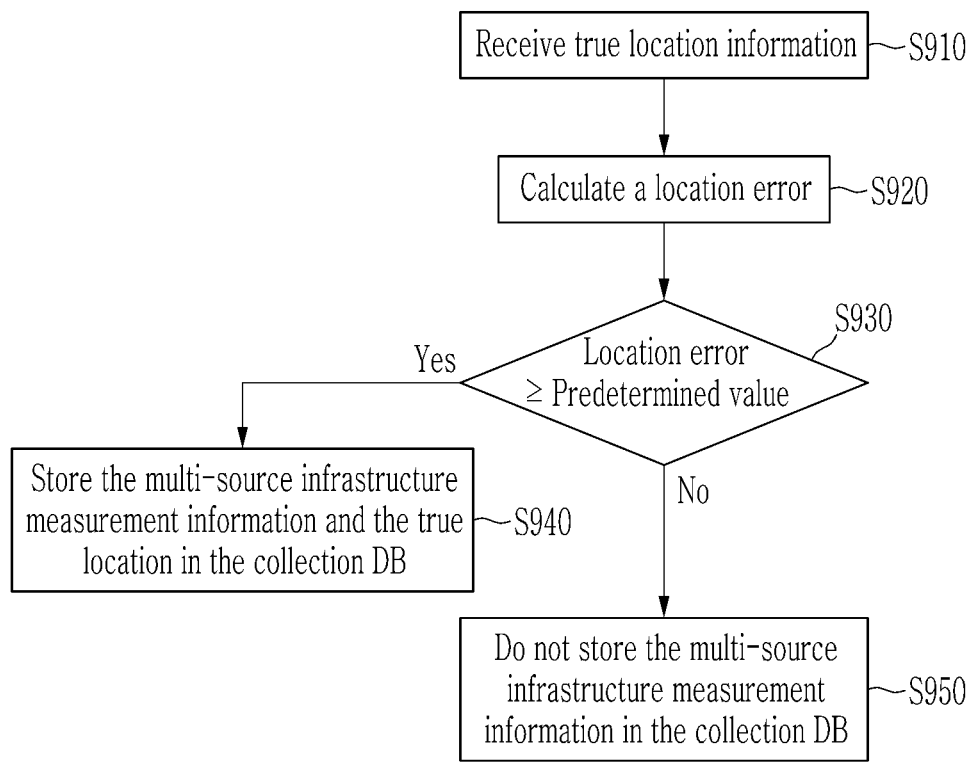
FIG. 9 is a flowchart illustrating a method of updating the collection DB in the collection DB updater shown in FIG. 1.

FIG. 9 is a flowchart illustrating a method of updating the collection DB in the collection DB updater shown in FIG. 1.

Referring to FIG. 9, the location of the location request terminal 10 is determined from the multi-source infrastructure measurement information provided by the location request terminal 10 for location calculation at an arbitrary location by the location determiner 180.

The collection DB updater 190 receives a true location information of the location request terminal 10 or the measurement location information of the location request terminal 10 determined by another location method having high location accuracy (S910), and calculates the location error of the location request terminal 10 determined by the method shown in FIG. 7 or FIG. 8 based on the received location information (S920).

The collection DB updater 190 compares the location error with a predetermined value (S930).

If the location error is greater than or equal to the predetermined value, the collection DB updater 190 updates the collection DB 120 by storing multi-source infrastructure measurement information provided by the location request terminal 10 for location calculation and the received true location (or measurement location) information of the location request terminal 10 (S940). In this way, it is possible to supplement the incomplete or inaccurate collection information of the collection DB 120 by using the multi-source infrastructure measurement information at the correct location.

On the other hand, the collection DB updater 190 does not store the multi-source infrastructure measurement information provided by the location request terminal 10 for location calculation in the collection DB 120 when the location error is smaller than the predetermined value (S950).

Typically, the collection DB 120 may include various measurement errors depending on whether to move when collecting, a long-range or short-range wireless communication channel state, whether the sensor is calibrated, the accuracy of the collection location, etc. Also, because the measurement errors are caused by multiple factors, error modeling is not simple. Therefore, there is a need for a method for filtering abnormal measurement information or supplementing insufficient measurement information by collecting a plurality of pieces of measurement information in an arbitrary collection location and then stating it. In this embodiment, by storing the multi-source infrastructure measurement information provided by the location request terminal 10 for location calculation in the same way as above together with accurate location information in the collection DB 120, measurement information of points where location performance is insufficient can be replaced or supplemented with more accurate measurement information.

Figure 10:
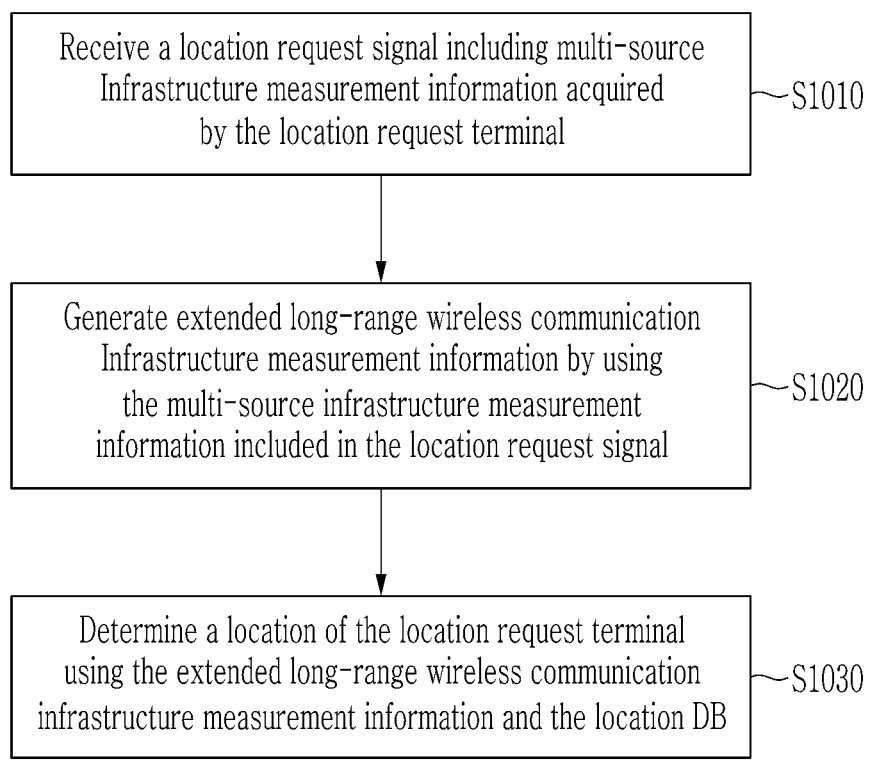
FIG. 10 is a flowchart illustrating a method of estimating a location of a location requesting terminal according to an embodiment.

FIG. 10 is a flowchart illustrating a method of estimating a location of a location requesting terminal according to an embodiment.

Referring to FIG. 10, the apparatus for estimating a location 100 receives a location request signal including multi-source infrastructure measurement information acquired by the location request terminal 10 from the location request terminal 10 (S1010).

The apparatus for estimating a location 100 generates extended long-range wireless communication infrastructure measurement information by using the multi-source infrastructure measurement information included in the location request signal (S1020). The apparatus for estimating a location 100 may generate extended long-range wireless communication infrastructure measurement information based on the method described with reference to FIG. 6.

The apparatus for estimating a location 100 determines the location of the location request terminal 10 using the extended long-range wireless communication infrastructure measurement information and the location DB 140 (S1030). The apparatus for estimating a location 100 may determine the location of the location request terminal 10 based on the method described with reference to FIG. 7 or FIG. 8.

In order to determine the location of the location request terminal 10 in this way, the location DB 140 must be firstly generated and constructed, and the location DB 140 may be generated by the method described with reference to FIG. 4 or FIG. 5.

Figure 11:
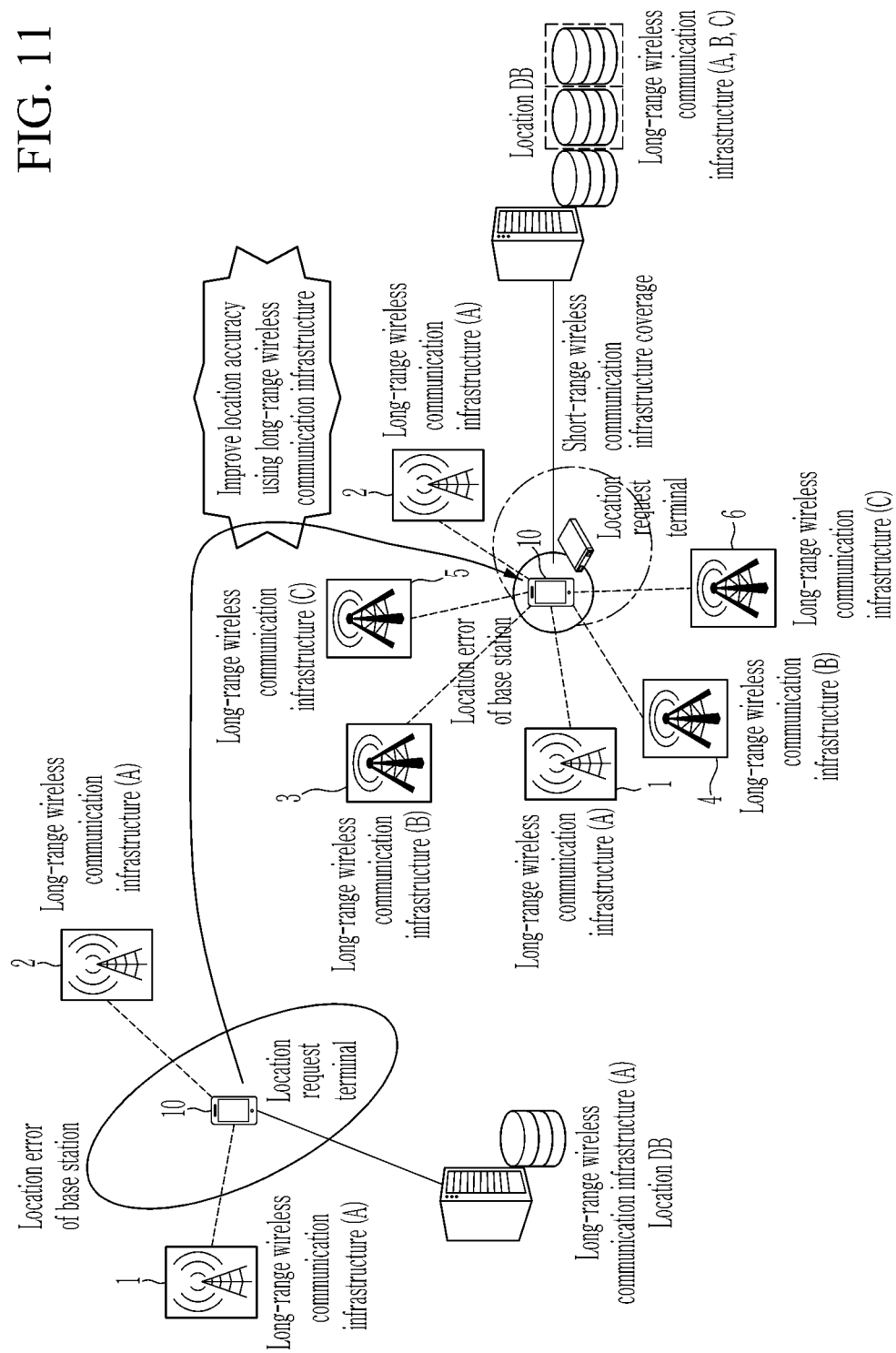
FIG. 11 is a diagram for explaining an effect of improving location accuracy of a method for estimating a location according to an embodiment.

FIG. 11 is a diagram for explaining an effect of improving location accuracy of a method for estimating a location according to an embodiment.

Referring to FIG. 11, when the location of the location request terminal 10 is calculated using only a small amount of long-range wireless communication infrastructure measurement information that the location request terminal 10 can acquire, the location accuracy may be lowered.

On the other hand, the apparatus for estimating a location 100 according to the embodiment estimates a plurality of different types of long-range wireless communication infrastructure measurement information measured at the same location as the location request terminal 10 through similarity matching between the short-range wireless communication infrastructure measurement information provided from the location request terminal 10 and the short-range wireless communication infrastructure measurement information in the location request measurement information DB 160, combines the long-range wireless communication infrastructure measurement information that the location requesting terminal 10 can acquire and the estimated plurality of different types of long-range wireless communication infrastructure measurement information, and then calculates the location of the location request terminal 10, so it is possible to provide improved location accuracy.

Figure 12:
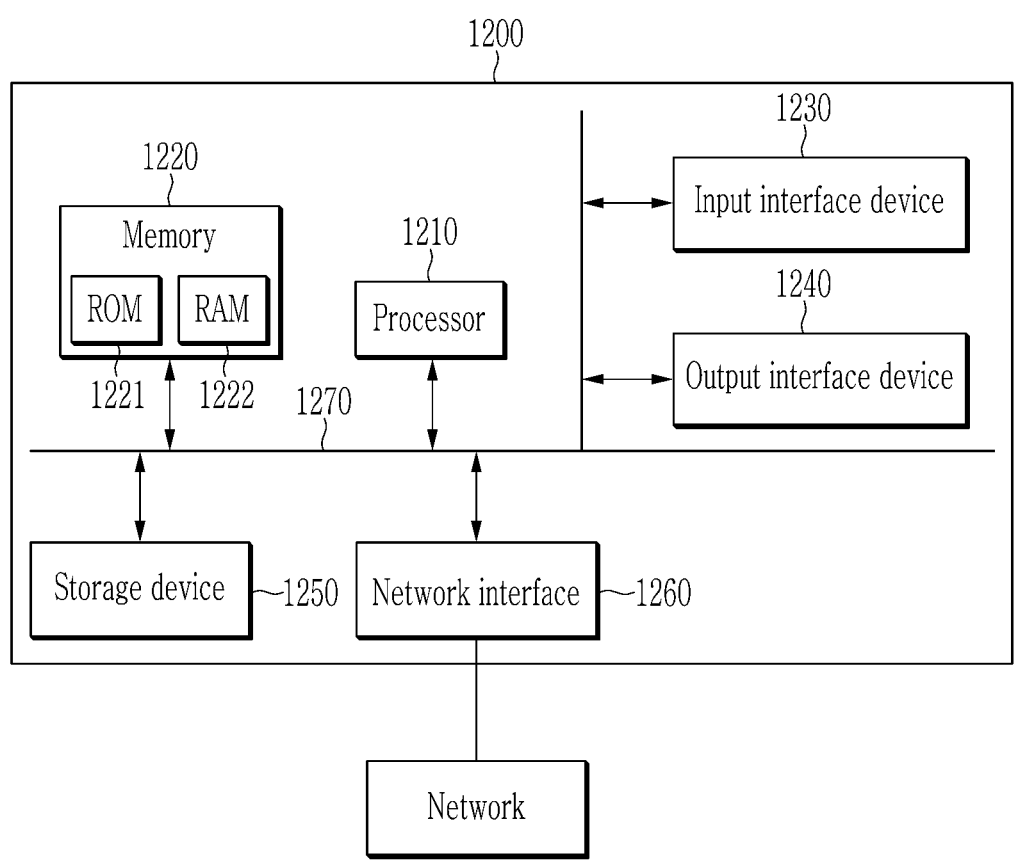
FIG. 12 is a diagram illustrating an apparatus for estimating a location according to another exemplary embodiment.

FIG. 12 is a diagram illustrating an apparatus for estimating a location according to another exemplary embodiment.

Referring to FIG. 12, the apparatus for estimating a location 100 may represent a computing device in which the above-described method for estimating a location is implemented.

The apparatus for estimating a location 1200 may include at least one of a processor 1210, a memory 1220, an input interface device 1230, an output interface device 1240, a storage device 1250, and a network interface device 1260. Each of the components may be connected by a common bus 1270 to communicate with each other. In addition, each of the components may be connected through an individual interface or a separate bus centering on the processor 1210 instead of the common bus 1270.

The processor 1210 may be implemented as various types such as an application processor (AP), a central processing unit (CPU), a graphics processing unit (GPU), etc., and may be any semiconductor device that executes a command stored in the memory 1220 or the storage device 1250. The processor 1210 may execute program commands stored in at least one of the memory 1220 and the storage device 1250. The processor 1210 stores program commands for implementing at least some functions of the multi-source infrastructure collector 110, the location DB generator 130, the location request collector 150, the extended long-range wireless communication infrastructure measurement information generator 170, the location determiner 180, and the collection DB updater 190 described with reference to FIG. 1 in the memory 1220, and may control to perform the operation described with reference to FIGS. 1 to 10.

The memory 1220 and the storage device 1250 may include the collection DB 120, the location DB 140, and the location request measurement information DB 160. The memory 1220 and the storage device 1250 may include various types of volatile or non-volatile storage media. For example, the memory 1220 may include a read-only memory (ROM) 1221 and a random access memory (RAM) 1222. The memory 1220 may be located inside or outside the processor 1210, and the memory 1220 may be connected to the processor 1210 through various known means.

The input interface device 1230 is configured to provide data to the processor 1210.

The output interface device 1240 is configured to output data from the processor 1210.

The network interface apparatus 1260 may transmit or receive a signal with another device (e.g., a user terminal) through a wired network or a wireless network.

At least some of the method for estimating a location according to an embodiment of the present disclosure may be implemented as a program or software executed in a computing device, and the program or software may be stored in a computer-readable medium.

In addition, at least some of the method for estimating a location according to an embodiment of the present disclosure may be implemented as hardware that can be electrically connected to the computing device.

According to the embodiment, by generating extended long-range wireless communication infrastructure measurement information by combining various types of long-range wireless communication infrastructure measurement information having a high similarity between short-range wireless communication infrastructure measurement information based on outdoor collection data that can be collected relatively quickly without indoor collection, it is possible to provide improved location accuracy through an increase in the amount of wireless communication infrastructure and frequency diversity.

In addition, by using a plurality of pieces of long-range wireless communication infrastructure measurement information having a high similarity between short-range wireless communication infrastructure measurement information, location accuracy can be increased compared to a method using only long-range wireless communication infrastructure measurement information obtainable by the location request terminal.

The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing, or to control an operation of a data processing apparatus, e.g., by a programmable processor, a computer, or multiple computers. A computer program(s) may be written in any form of programming language, including compiled or interpreted languages, and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read-only memory (CD-ROM), a digital video disk (DVD), etc., and magneto-optical media such as a floptical disk and a read-only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (OS) and one or more software applications that run on the OS. The processor device may also access, store, manipulate, process, and create data in response to execution of the software. For the purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implementations, but it should be understood that the details do not limit any disclosure or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring separation of various apparatus components in the above-described example embodiments in all example embodiments, and it should be understood that the above-described program components and apparatuses may be incorporated into a single software product or may be packaged in multiple software products. It should be understood that the embodiments disclosed herein are merely illustrative and are not intended to limit the scope of the disclosure. It will be apparent to one of ordinary skill in the art that various modifications of the embodiments may be made without departing from the spirit and scope of the claims and their equivalents.

What is claimed is:

1. A method for estimating a location of a location request terminal in an apparatus for estimating a location, the method comprising:
receiving a location request signal including first wireless communication infrastructure measurement information through a first wireless communication infrastructure of a first coverage range and second wireless communication infrastructure measurement information through a second wireless communication infrastructure of a second coverage range greater than the first coverage range acquired by the location request terminal, from the location request terminal;
estimating different types of second wireless communication infrastructure measurement information measured at the same location as the location request terminal;
generating extended second wireless communication infrastructure measurement information by combining the second wireless communication infrastructure measurement information included in the location request signal and the estimated different types of second wireless communication infrastructure measurement information; and
determining a location of the location request terminal through comparison between a location DB storing the measurement information collected through the first wireless communication infrastructure and the second wireless communication infrastructure in correspondence with each grid location and the extended second wireless communication infrastructure measurement information; and
storing the first wireless communication infrastructure measurement information and the second wireless communication infrastructure measurement information included in the location request signal in a location request measurement information DB,
wherein the estimating includes:
comparing the similarity between the first wireless communication infrastructure measurement information included in the location request signal and the first wireless communication infrastructure measurement information stored in the location request measurement information DB; and
extracting second wireless communication infrastructure measurement information corresponding to the first wireless communication infrastructure measurement information having the maximum similarity for each type of second wireless communication infrastructure to which the location request terminal is not subscribed from the location request measurement information DB.

2. The method of claim 1, further comprising:
before the receiving,
dividing a certain area into a plurality of grids;
generating combined measurement information for each infrastructure type by combining the measurement information at all collection locations in the same grid by infrastructure type, by using collection locations of the measurement information collected through the first wireless communication infrastructure and the second wireless communication infrastructure; and
storing the combined measurement information for each type of infrastructure for each grid in the location DB.

3. The method of claim 2, wherein the determining includes determining a location of the grid having the maximum similarity matching as the location of the location request terminal, through a similarity comparison between the extended second wireless communication infrastructure measurement information and combined second wireless communication infrastructure measurement information for each grid stored in the location DB.

4. The method of claim 2, wherein the determining includes determining the location of the location request terminal using at least one grid location having similarity matching equal to or greater than a threshold value through a similarity comparison between the extended second wireless communication infrastructure measurement information and the combined second wireless communication infrastructure measurement information stored in the location DB.

5. The method of claim 2, further comprising:
calculating matching information for each grid by comparing the measurement information for each collection location for image matching and the combined measurement information for each type of infrastructure in each grid adjacent to each collection location;
generating a matching information distribution image for each grid by using the matching information for each grid; and storing the matching information distribution image for each grid in the location DB.

6. The method of claim 5, wherein the determining includes:
generating an extended second wireless communication infrastructure matching distribution image by calculating matching information between the extended second wireless communication infrastructure measurement information and the combined second wireless communication infrastructure measurement information for each grid in the location DB; and
determining the location of the location request terminal through similarity matching between the extended second wireless communication infrastructure matching distribution image and the matching information distribution image for each grid stored in the location DB.

7. The method of claim 1, wherein the measurement information collected through the first wireless communication infrastructure and the second wireless communication infrastructure is preferentially stored in a collection DB together with a collection location, and
the method further comprising:
when receiving a true location of the location request terminal, calculating a location error for the determined location of the location request terminal using the true location; and
storing the first wireless communication infrastructure measurement information and the second wireless communication infrastructure measurement information included in the location request signal together with the true location in the collection DB if the location error is greater than or equal to a set value.

8. The method of claim 1, wherein the first wireless communication infrastructure includes a microcell or a femtocell, and the second wireless communication infrastructure includes a macrocell.

9. The method of claim 1, wherein the first wireless communication infrastructure includes a sensor infrastructure linked to the inside or outside of the location request terminal.

10. An apparatus for estimating a location of a location request terminal, the apparatus comprising:
at least one processor; and memory having instructions stored thereon, which, when executed by the at least one processor, cause the at least one processor to execute:
a location request measurement information DB;
a location request collector that receives a location request signal including first wireless communication infrastructure measurement information through a first wireless communication infrastructure of a first coverage range and second wireless communication infrastructure measurement information through a second wireless communication infrastructure of a second coverage range greater than the first coverage range acquired by the location request terminal, from the location request terminal, and stores the first wireless communication infrastructure measurement information and the second wireless communication infrastructure measurement information included in the location request signal in the location request measurement information DB;
a location DB that stores measurement information collected through the first wireless communication infrastructure and the second wireless communication infrastructure in correspondence with each grid location;
an extended long-range wireless communication infrastructure measurement information generator that estimates different types of second wireless communication infrastructure measurement information measured at the same location as the location request terminal from the location request measurement information DB, and generates extended second wireless communication infrastructure measurement information by combining the second wireless communication infrastructure measurement information included in the location request signal and the estimated different type of second wireless communication infrastructure measurement information from the location request measurement information DB; and
a location determiner that determines a location of the location request terminal through the comparison between the extended second wireless communication infrastructure measurement information and the measurement information in the location DB; and
a location DB generator that divides a certain area into a plurality of grids, generates combined measurement information for each infrastructure type by combining the measurement information at all collection locations in the same grid by infrastructure type, by using collection locations of the measurement information collected through the first wireless communication infrastructure and the second wireless communication infrastructure, and stores the combined measurement information for each type of infrastructure for each grid in the location DB.

11. The apparatus of claim 10, wherein the extended long-range wireless communication infrastructure measurement information generator compares the similarity between the first wireless communication infrastructure measurement information included in the location request signal and the first wireless communication infrastructure measurement information stored in the location request measurement information DB, and extracts second wireless communication infrastructure measurement information corresponding to the first wireless communication infrastructure measurement information having the maximum similarity for each type of second wireless communication infrastructure to which the location request terminal is not subscribed from the location request measurement information DB.

12. The apparatus of claim 10, wherein the location determiner determines a location of the grid having the maximum similarity matching as the location of the location request terminal, through a similarity comparison between the extended second wireless communication infrastructure measurement information and combined second wireless communication infrastructure measurement information for each grid stored in the location DB.

13. The apparatus of claim 10, wherein the location determiner determines the location of the location request terminal using at least one grid location having similarity matching equal to or greater than a threshold value through a similarity comparison between the extended second wireless communication infrastructure measurement information and the combined second wireless communication infrastructure measurement information stored in the location DB.

14. The apparatus of claim 10, wherein the location DB generator calculates matching information for each grid by comparing the measurement information for each collection location for image matching and the combined measurement information for each type of infrastructure in each grid adjacent to each collection location, generates a matching information distribution image for each grid by using the matching information for each grid, and stores the matching information distribution image for each grid in the location DB.

15. The apparatus of claim 14, wherein the location determiner generates an extended second wireless communication infrastructure matching distribution image by calculating matching information between the extended second wireless communication infrastructure measurement information and the combined second wireless communication infrastructure measurement information for each grid in the location DB, and determines the location of the location request terminal through similarity matching between the extended second wireless communication infrastructure matching distribution image and the matching information distribution image for each grid stored in the location DB.

16. The apparatus of claim 10, further comprising a multi-source infrastructure collector that collects measurement information together with collection locations through the first wireless communication infrastructure and the second wireless communication infrastructure using user participation or a dedicated collection method and stores it in a collection DB.

17. The apparatus of claim 16, further comprising a collection DB updater that calculates a location error for the determined location of the location request terminal using a true location of the location request terminal, and stores the first wireless communication infrastructure measurement information and the second wireless communication infrastructure measurement information included in the location request signal together with the true location in the collection DB if the location error is greater than or equal to a set value, when the true location of the location request terminal is received.

18. The apparatus of claim 10, wherein the first wireless communication infrastructure includes a microcell or a femtocell, and the second wireless communication infrastructure includes a macrocell.

* * * * *